United States Patent
Nelapati et al.

(10) Patent No.: US 12,109,946 B2
(45) Date of Patent: Oct. 8, 2024

(54) CABIN CHILD SEAT MONITORING METHODS AND SYSTEMS

(71) Applicant: GM GLOBAL TECHNOLOGY OPERATIONS LLC, Detroit, MI (US)

(72) Inventors: Praneeth Nelapati, Novi, MI (US); Jeffrey A Clark, Macomb Township, MI (US); Sean Taylor Coughlin, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 310 days.

(21) Appl. No.: 17/455,200

(22) Filed: Nov. 16, 2021

(65) Prior Publication Data

US 2023/0150426 A1    May 18, 2023

(51) Int. Cl.
*G05D 1/00* (2024.01)
*B60N 2/00* (2006.01)
*B60N 2/26* (2006.01)
*B60Q 9/00* (2006.01)

(52) U.S. Cl.
CPC .............. *B60Q 9/00* (2013.01); *B60N 2/002* (2013.01); *B60N 2/26* (2013.01)

(58) Field of Classification Search
CPC ....................................................... B60Q 9/00
See application file for complete search history.

(56) References Cited

U.S. PATENT DOCUMENTS

| | | | |
|---|---|---|---|
| 4,910,513 A * | 3/1990 | Kelly | G01C 23/005 340/975 |
| 8,848,879 B1 * | 9/2014 | Coughlan | H04M 1/57 455/567 |
| 2005/0280297 A1 * | 12/2005 | Patterson | B60N 2/0244 297/217.3 |
| 2013/0009766 A1 * | 1/2013 | Shaw | B60N 2/26 340/457 |
| 2017/0232868 A1 * | 8/2017 | Izuno | B60R 21/01556 73/760 |
| 2020/0269795 A1 * | 8/2020 | Angermayer | G01S 13/751 |
| 2020/0284895 A1 * | 9/2020 | Das | G01S 13/32 |
| 2021/0127226 A1 * | 4/2021 | Sutherland | H04W 4/027 |

FOREIGN PATENT DOCUMENTS

| | | | |
|---|---|---|---|
| DE | 10306862 B3 | 4/2004 | |
| DE | 102011117375 A1 | 5/2013 | |
| DE | 102017005442 A1 | 3/2018 | |
| KR | 20210117050 A * | 9/2021 | B62B 9/102 |
| WO | WO-2019026076 A1 * | 2/2019 | A61B 5/0205 |

* cited by examiner

*Primary Examiner* — Vivek D Koppikar
*Assistant Examiner* — Paul W Arellano
(74) *Attorney, Agent, or Firm* — Lorenz & Kopf LLP

(57) ABSTRACT

In accordance with an exemplary embodiment, a system is provided that includes a sensor system configured to generate sensor data associated with a seat of a vehicle; and a processor communicatively coupled to the sensor system and configured to determine, from the sensor data, a baseline position of a child seat sitting on the seat of the vehicle, determine, from the sensor data, a displacement of the child seat from the baseline position, and selectively generate notification data based on the displacement.

20 Claims, 3 Drawing Sheets

CABIN CHILD SEAT MONITORING METHODS AND SYSTEMS

TECHNICAL FIELD

The technical field generally relates to vehicles and, more specifically, to methods and systems for monitoring child seats of the vehicles.

Vehicle in cabin monitoring feature space using active safety sensors is evolving. Certain vehicles today include systems for determining whether a seat of the vehicle includes an occupant or object. In some instances, a seat of a vehicle may include a child seat that is or is not occupied by a child.

The child seat may not be securely installed to the seat and thus, the position of the child seat may vary relative to the seat during operation of the vehicle. Varying of the child seat position can cause different levels of retention on the child occupying the seat.

Accordingly, it is desirable to provide methods and systems for monitoring the position of the child seat when the seat is and is not occupied by a child. Other desirable Furthermore, other desirable features and characteristics of the present invention will become apparent from the subsequent detailed description and the appended claims, taken in conjunction with the accompanying drawings and the foregoing technical field and background.

SUMMARY

In accordance with an exemplary embodiment, a system is provided that includes a sensor system and a processor. The sensor system is configured to generate sensor data associated with a seat of a vehicle. The processor is communicatively coupled to the sensor system and is configured to determine, from the sensor data, a baseline position of a child seat sifting on the seat of the vehicle, determine, from the sensor data, a displacement of the child seat from the baseline position, and selectively generate notification data based on the displacement.

In various embodiments, the sensor system includes a radar configured within a cabin of the vehicle.

In various embodiments, the processor is configured to determine the displacement based on range and doppler data from the radar.

In various embodiments, the processor is configured to adjust the displacement based on parameters determined from vehicle maneuvers.

In various embodiments, the processor is further configured to determine an ingress or egress event of the vehicle, and wherein the processor determines the baseline position of the child seat based on the ingress or egress event.

In various embodiments, the processor is further configured to evaluate a speed of the vehicle, and wherein the processor determines the displacement of the child seat in response to the evaluating the speed of the vehicle.

In various embodiments, the displacement includes a dynamically adjusted maximum and a dynamically adjusted minimum value in any direction.

In various embodiments, the processor is further configured to determine, based on the sensor data, whether a child is sitting in the child seat, and wherein the processor selectively generates the notification data based on whether the child is sitting in the child seat.

In various embodiments, the processor is further configured to receive user input and configure the notification data based on the user input.

In various embodiments, the notification data initiates at least one of a visual notification, an audio notification, and a haptic notification.

In another embodiments, a method includes: receiving, by a processor, sensor data associated with a seat of a vehicle; determining, by the processor and from the sensor data, a baseline position of a child seat sitting on the seat of the vehicle; determining, by the processor and from the sensor data, a displacement of the child seat from the baseline position; and selectively generating, by the processor, notification data based on the displacement.

In various embodiments, the sensor system includes a radar configured within a cabin of the vehicle.

In various embodiments, the determining the displacement is based on range and doppler data from the radar.

In various embodiments, the method further includes adjusting the displacement based on parameters determined from vehicle maneuvers.

In various embodiments, the method further includes determining an ingress or egress event of the vehicle, and wherein the determining the baseline position of the child seat is based on the ingress or egress event.

In various embodiments, the method further includes evaluating a speed of the vehicle, and wherein the determining the displacement of the child seat is in response to the evaluating the speed of the vehicle.

In various embodiments, the displacement includes a dynamically adjusted maximum and an adjusted minimum value in any direction.

In various embodiments, the method further includes determining, based on the sensor data, whether a child is sitting in the child seat, and wherein the selectively generating the notification data is based on whether the child is sitting in the child seat.

In various embodiments, the method further includes receiving user input and configuring the notification data based on the user input.

In various embodiments, the notification data initiates at least one of a visual notification, an audio notification, and a haptic notification.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
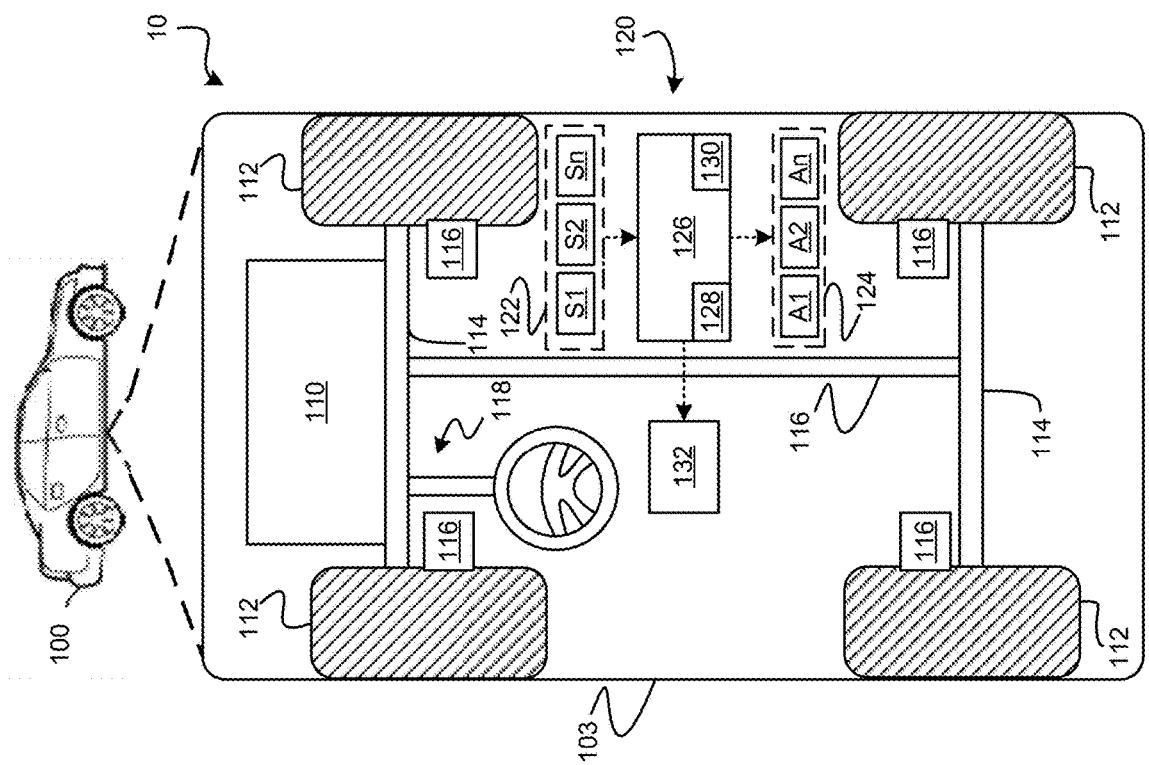
FIG. 1 is a functional block diagram of a vehicle that includes a seat monitoring system, in accordance with exemplary embodiments.

With reference to FIG. 1, a seat monitoring system shown generally at 10 is associated with a vehicle 100 in accordance with various embodiments. In general, the seat monitoring system 10 receives sensor data from one or more in cabin sensors and determines a position of a child seat and/or a child in the child seat based on the sensor data. The position of the child seat and/or the child is then used to monitor for retention of the child seat and/or child (i.e., loose seatbelt or no seatbelt securing). The seat monitoring system 10 selectively generates notifications to a user of the vehicle 100 based on the monitoring of the retention.

In various embodiments, the vehicle 100 is an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various other embodiments, the vehicle 100 may also be another vehicle, such as an aircraft, a watercraft, a sport utility vehicle, a truck, and so on, and/or one or more other types of mobile platforms (e.g., a robot and/or other mobile platform).

The vehicle 100 includes a body 103 that is arranged on a chassis 116. The body 103 substantially encloses other components of the vehicle 100. The body 103 and the chassis 116 may jointly form a frame. The vehicle 100 also includes a plurality of wheels 112. The wheels 112 are each rotationally coupled to the chassis 116 near a respective corner of the body 103 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

A brake system 116 is configured to provide braking torque to the vehicle wheels 112. The brake system 116 may, in various embodiments, include friction brakes, brake by wire, a regenerative braking system such as an electric machine, and/or other appropriate braking systems. A steering system 118 influences a position of the of the vehicle wheels 112. While depicted as including a steering wheel for illustrative purposes, in some embodiments contemplated within the scope of the present disclosure, the steering system 118 may not include a steering wheel.

In various embodiments, the drive system 110 and/or other components of the vehicle 100 are controlled by a control system 120. The control system 120 includes a sensor system 122, an actuator system 124, and a controller 126. In various embodiments, the control system 126 communicates with a notification system 132. The notification system 132 can include any means for notifying an occupant of the vehicle 100 by, for example, a visual notification, an auditory notification, and/or a haptic notification.

The sensor system 122 includes one or more sensing devices S1-Sn that sense observable conditions of the exterior environment and/or the interior environment of the vehicle 100. The sensing devices S1-Sn can generally include, but are not limited to, radars, lidars, global positioning systems, optical cameras, thermal cameras, ultrasonic sensors, inertial measurement units, and/or other sensors.

The actuator system 124 includes one or more actuator devices A1-An that control one or more vehicle features such as, but not limited to, the drive system 110, the steering system 118, and the brake system 116. In various embodiments, the vehicle features can further include interior and/or exterior vehicle features such as, but are not limited to, doors, a trunk, and cabin features such as air, music, lighting, etc. (not numbered).

The controller 126 includes at least one processor 128 and a computer readable storage device or media 130. The processor 128 can be any custom made or commercially available processor, a central processing unit (CPU), a graphics processing unit (GPU), an auxiliary processor among several processors associated with the controller 126, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 128 is powered down. The computer-readable storage device or media 130 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 126 in controlling the vehicle 100.

The instructions may include one or more separate programs, each of which comprises an ordered listing of executable instructions for implementing logical functions. The instructions, when executed by the processor 126, receive and process signals from the sensor system 122, perform logic, calculations, methods and/or algorithms for automatically controlling the components of the vehicle 100, and generate control signals to the actuator system 124 to automatically control the components of the vehicle 100 based on the logic, calculations, methods, and/or algorithms. Although only one controller 126 is shown in FIG. 1, embodiments of the vehicle 100 can include any number of controllers 126 that communicate over any suitable communication medium or a combination of communication mediums and that cooperate to process the sensor signals, perform logic, calculations, methods, and/or algorithms, and generate control signals to automatically control features of the vehicle 100. In various embodiments, one or more instructions of the controller 126 are embodied in the seat monitoring system 10 and, when executed by the processor 128, process sensor data from the sensor system 122, perform a process as described in more detail with regard to FIG. 3, and generate signal data for generating notifications through the notification system 132.

Figure 2:
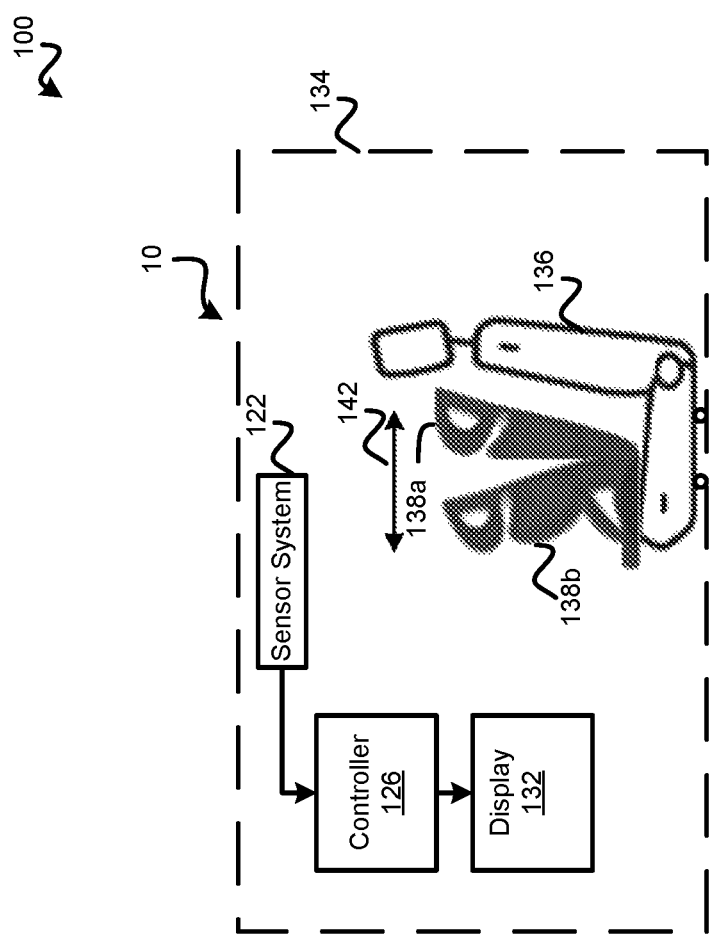
FIG. 2 is a functional block diagram illustrating a seat monitoring system, in accordance with exemplary embodiments.

As shown in more detail in FIG. 2, the body 103 and/or frame 116 of the vehicle 100 of FIG. 1 form an interior cabin 134. Configured within the cabin 134 are one or more rows of seats 136 that are secured to a floor of the vehicle 100. For exemplary purposes, a single row of one seat 136 is shown. As can be appreciated, more rows and/or more seats can be implemented in the vehicle 100, in the various embodiments.

At least one of the seats 136 of the row(s) is configured to receive a child seat referred to generally as 138. In various embodiments, the child seat 138 includes a base, a back support, and a head support. In various embodiments, a seatbelt (not shown) secures the child seat 138 and the child to the seat 136 in a first position shown as child seat 138*a*. In some instances, vehicle maneuvers may cause the child seat 138 to move from the original, secured position 138*a* to another position shown as child seat 138*b*. The sensor system 122 senses the presence of the child seat, senses the presence of a child, and senses movement 142 of the child seat and generates sensor signals indicating the movement 142 to the controller 126.

In various embodiments, the sensor system 122 may be comprised of one or more occupant mass or force sensors, weight sensors, cameras, range sensors (i.e., radar or lidar), audio sensors, biometric sensors, and/or input sensors. In various embodiments, the occupant mass or force sensors and/or weight sensors are coupled to one or more seats of the vehicle 100 and are configured to detect the presence of an occupant or object on the vehicle seats. In certain embodiments, the cameras, the range sensors, the audio sensor, and the biometric sensors are disposed inside the cabin 134 and configured to detect the seat 136, the child seat 138 and/or occupants within the cabin 134 of the vehicle 100.

In addition, in certain embodiments, the input sensors comprise one or more touch screen sensors, additional audio sensors (microphones), and/or other input sensors configured to obtain inputs from a driver and/or other occupant of the vehicle 100 (including as to confirmation and/or refinement of the seat monitoring system 10).

In various embodiments, the display system 132 provides notifications to a driver or other user of the vehicle 100 as to a status of the seat monitoring. Also in various embodiments, the display system 132 allows the driver or other user of the vehicle 100 the opportunity to confirm and/or refine the parameters of the seat monitoring system 10, for example via interaction with the display system 135 as detected via the input sensors. In certain embodiments, the display system 132 provides a visual depiction of the notification, for example via a display screen. In certain embodiments, an audio, haptic and/or other description of the information pertaining thereto may be provided by the display system 132.

In various embodiments, the controller 126 is disposed within the body 103 of the vehicle 100 as shown. In certain embodiments, the controller 126 and/or one or more components thereof may be disposed outside the body 103, for example on a remote server, in the cloud, or other device where data processing is performed remotely.

It will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 128) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIGS. 1 and 2, for example in that the computer system of the controller 126 may be coupled to or may otherwise utilize one or more remote computer systems and/or other control systems.

Figure 3:
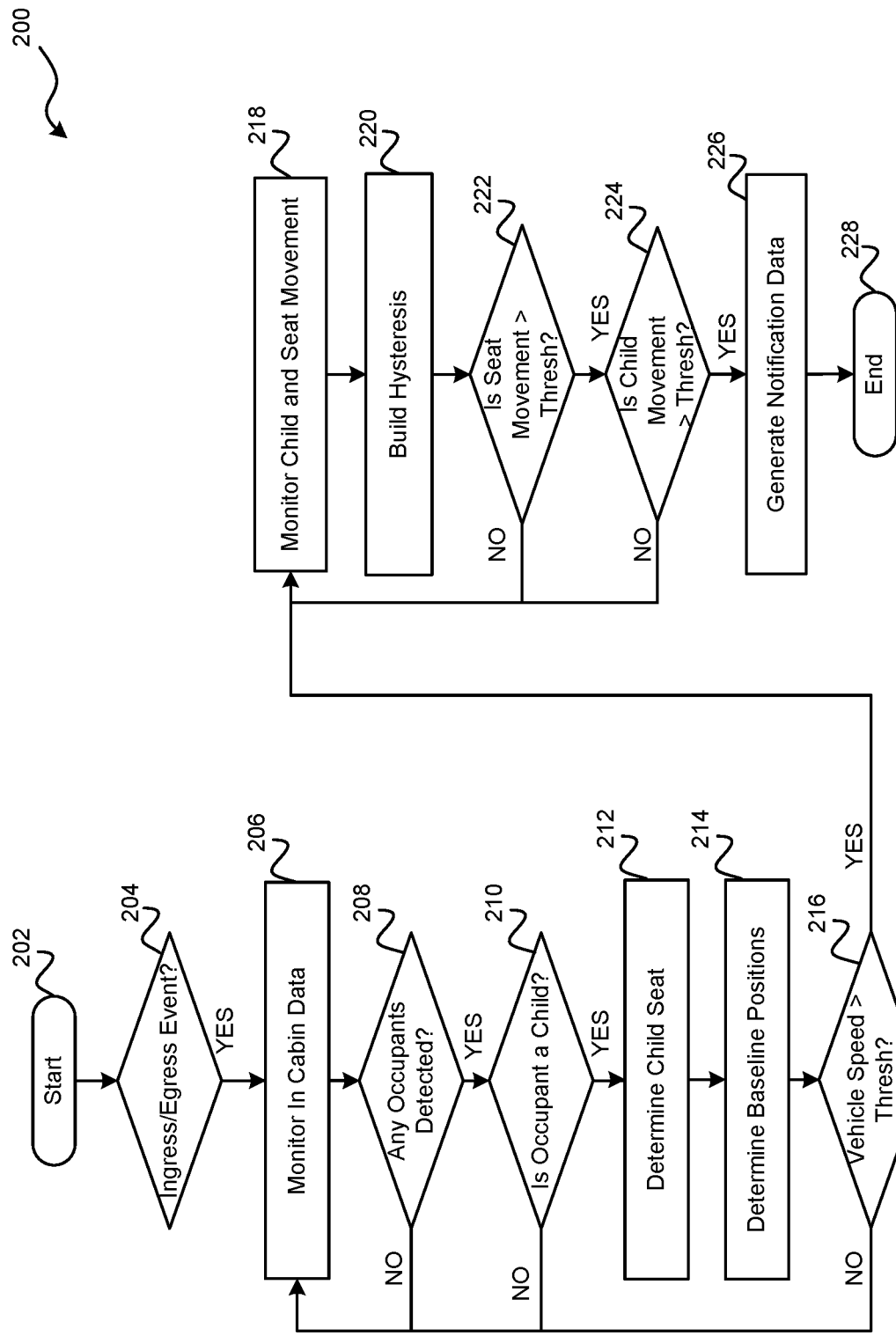
FIG. 3 is a flowchart of a process for monitoring a seat of a vehicle, in accordance with exemplary embodiments.

FIG. 3 is a flowchart of a process 200 for monitoring a child seat of a vehicle and for selectively generating notifications based thereon, in accordance with exemplary embodiments. The process 200 can be implemented in connection with the vehicle 100 of FIGS. 1 and 2, in accordance with exemplary embodiments. As can be appreciated in light of the disclosure, the order of operation within the process 200 is not limited to the sequential execution as illustrated in FIG. 3, but may be performed in one or more varying orders as applicable and in accordance with the present disclosure. In various embodiments, the process 200 can be scheduled to run based on one or more predetermined events, and/or can run continuously during operation of the vehicle 100.

As depicted in FIG. 3, the process 200 may begin at 202. In various embodiments, the process 200 begins when a vehicle drive or ignition cycle begins, for example when a user approaches or enters the vehicle 100, or when the user unlocks the vehicle, remote starts the vehicle, and/or opens a door of the vehicle (e.g. by turning a key, engaging a keyfob or other button, and so on). At 204, it is determined whether an occupant ingress/egress event has occurred, for example by monitoring door openings or other events associated therewith. If an ingress/egress event has occurred at 204, sensor data is obtained at 206. In various embodiments, the cabin is monitored by obtaining sensor data from one or more of the sensing devices of the sensor system.

In various embodiments, at 208, a determination is made as to whether a vehicle seat is occupied, for example, based on occupant sensor data. If a seat is not occupied at 208, the process 200 continues with monitoring the cabin at 206. If, however, a seat is determined to be occupied at 208, it is determined whether the seat is occupied by a child at 210. For example, the mass or weight data, or the camera data can be evaluated to determine if the seat is occupied by a child.

If the seat is not occupied by a child at 210, the process 200 continues with monitoring the cabin at 206. If, however, a seat is occupied by a child at 210, elevation resolution and doppler logic are used to determine the presence of a child seat at 212. A baseline rest position of the child seat and the seated child are established at 214.

Thereafter, the vehicle is monitored for motion at 216. For example, once the vehicle speed is greater than zero (or some other threshold speed), the child movement and the seat movement are monitored based on sensor data from the sensor system at seat movement and child movement hysteresis are determined at 220 and monitored at 222 and 224. For example, the radar sensor data is used 218 to determine the mean and max position displacements of the child seat in any direction. Vehicle dynamics information is used to understand the vehicle maneuvers and place a weightage to the observed data.

If the seat movement or child movement is not greater than a threshold at 222 and 224, the method continues with monitoring the child movement and seat movement at 218. If the seat movement or child movement is greater than a threshold at 222 and 224, notification data is generated to, for example, the notification device at 226, to notify an occupant of the vehicle that a retention malfunction may have occurred. Thereafter, the process 200 may end at 226.

As can be appreciated, the process 200 is configurable based on user input provided by a user through the notification system. For example, the user is provided an option to enable this feature as well as to determine the child seat location.

Accordingly, methods, systems, and vehicles are provided for monitoring a child seat of a vehicle. It will be appreciated that the systems, vehicles, and methods may vary from those depicted in the Figures and described herein. For example, the vehicle 100 of FIG. 1, and the control system 120 and components thereof, may vary in different embodiments. It will similarly be appreciated that the steps of the process 200 may differ from those depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A system comprising:
  a sensor system configured within a cabin of a vehicle and configured to generate sensor data indicative of a movement of a child seat sitting on a seat of the vehicle, wherein the sensor data includes at least one of elevation data, resolution data, range data, and doppler data;
  a processor of the vehicle and communicatively coupled to the sensor system, the processor configured to determine, from the sensor data, a baseline position of the child seat sitting on the seat of the vehicle, determine, from the sensor data, a real time displacement of the child seat from the baseline position in response to a vehicle speed being greater than a threshold speed and a vehicle dynamic information indicative of a vehicle maneuver, and selectively generate notification data based on the real time displacement exceeding a threshold displacement; and
  a user interface to display a visual notification to a vehicle occupant in response to the notification data.

2. The system of claim 1, wherein the sensor system includes a radar configured within the cabin of the vehicle, wherein the vehicle is an automobile.

3. The system of claim 2, wherein the processor is configured to determine the displacement based on the range data and the doppler data from the radar.

4. The system of claim 3, wherein the processor is configured to adjust the real time displacement based on parameters determined from vehicle maneuvers, a mean displacement and a maximum displacement, and wherein a weighted displacement is compared to the threshold displacement and the notification data is generated in response to the weighted displacement exceeding the threshold displacement.

5. The system of claim 1, wherein the processor is further configured to determine an ingress or egress event of the vehicle, and wherein the processor determines the baseline position of the child seat based on the ingress or egress event.

6. The system of claim 1, wherein the processor is further configured to evaluate a speed of the vehicle, and wherein the processor determines the displacement of the child seat in response to the evaluating the speed of the vehicle.

7. The system of claim 1, wherein the displacement includes a dynamically adjusted maximum and a dynamically adjusted minimum value in any direction.

8. The system of claim 1, wherein the processor is further configured to determine, based on the sensor data, whether a child is sitting in the child seat, and wherein the processor selectively generates the notification data based on whether the child is sitting in the child seat.

9. The system of claim 1, wherein the processor is further configured to receive user input and configure the notification data based on the user input.

10. The system of claim 1, wherein the notification data initiates at least one of a visual notification, an audio notification, and a haptic notification.

11. A method, comprising:
  receiving, by a processor, sensor data indicative of a movement of a child seat sitting on a seat within a cabin of a vehicle, wherein the sensor data includes at least one of elevation data, resolution data, range data, and doppler data generated by a sensor system within the cabin of the vehicle; and
  determining, by the processor and from the sensor data, a baseline position of the child seat sitting on the seat of the vehicle;

determining, by the processor and from the sensor data, a real time displacement of the child seat from the baseline position in response to a vehicle speed being greater than a threshold speed and a vehicle dynamic information indicative of a vehicle maneuver;

selectively generating, by the processor, notification data based on the real time displacement exceeding a threshold displacement; and displaying, via a user interface, a visual notification to a vehicle occupant in response to the notification data.

12. The method of claim 11, wherein the sensor system includes a radar configured within the cabin of the vehicle, wherein the vehicle is an automobile.

13. The method of claim 12, wherein the determining the displacement is based on the range data and the doppler data from the radar.

14. The method of claim 13, further comprising adjusting the displacement based on parameters determined from vehicle maneuvers.

15. The method of claim 11, further comprising determining an ingress or egress event of the vehicle, and wherein the determining the baseline position of the child seat is based on the ingress or egress event.

16. The method of claim 11, further comprising evaluating a speed of the vehicle, and wherein the determining the displacement of the child seat is in response to the evaluating the speed of the vehicle.

17. The method of claim 11, wherein the displacement includes a dynamically adjusted maximum and a dynamically adjusted minimum value in any direction.

18. The method of claim 11, further comprising determining, based on the sensor data, whether a child is sitting in the child seat, and wherein the selectively generating the notification data is based on whether the child is sitting in the child seat.

19. The method of claim 11, further comprising receiving user input and configuring the notification data based on the user input.

20. The method of claim 11, wherein the notification data initiates at least one of a visual notification, an audio notification, and a haptic notification.

* * * * *